Feb. 5, 1935.  H. E. FELLOWS  1,989,795
STRAINER AND METHOD OF MAKING STRAINER UNITS
Filed April 7, 1932  2 Sheets-Sheet 1
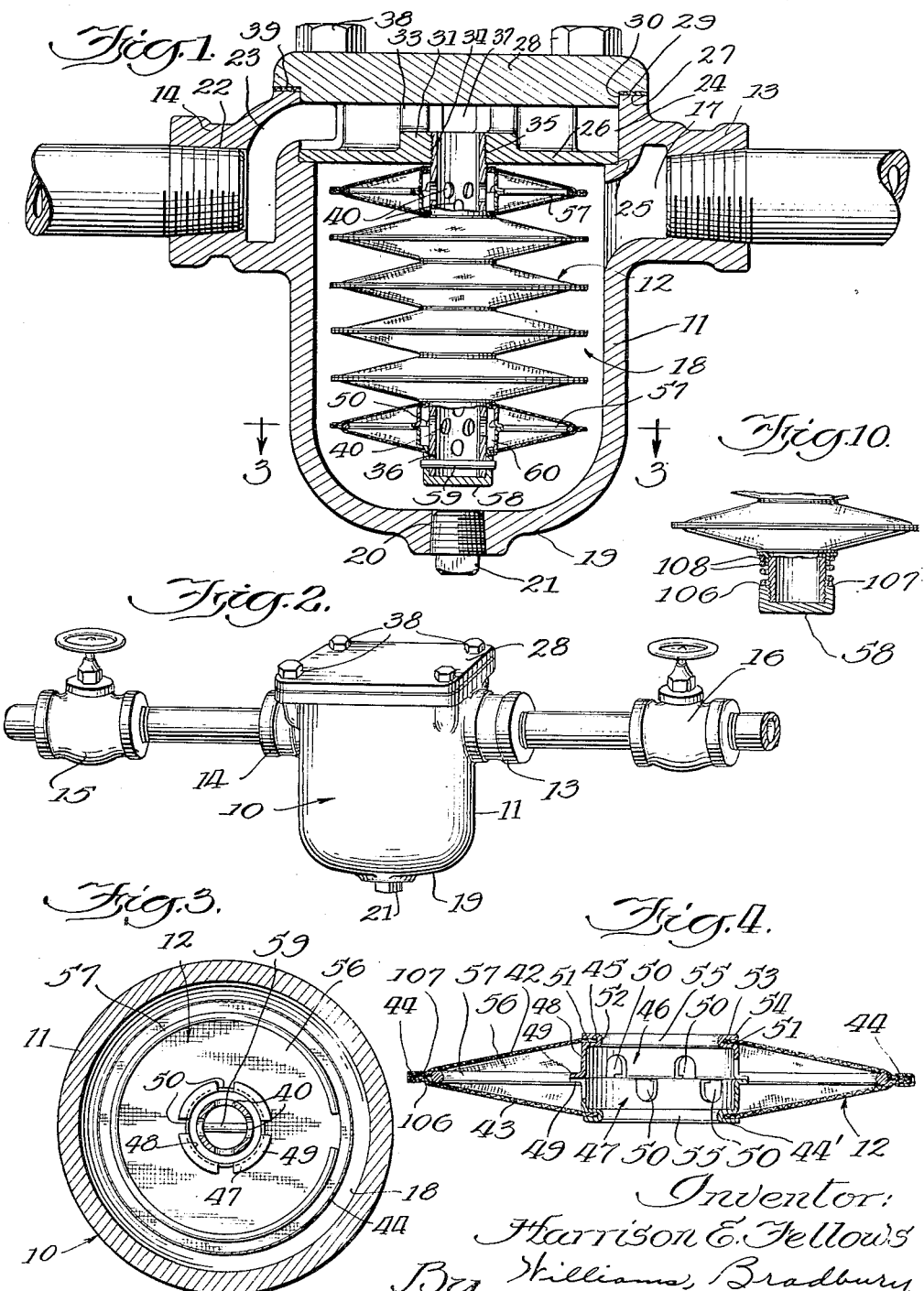
Inventor:
Harrison E. Fellows
By Williams, Bradbury,
McCaleb & Hinkle.
Attys Feb. 5, 1935.  H. E. FELLOWS  1,989,795
STRAINER AND METHOD OF MAKING STRAINER UNITS
Filed April 7, 1932  2 Sheets-Sheet 2
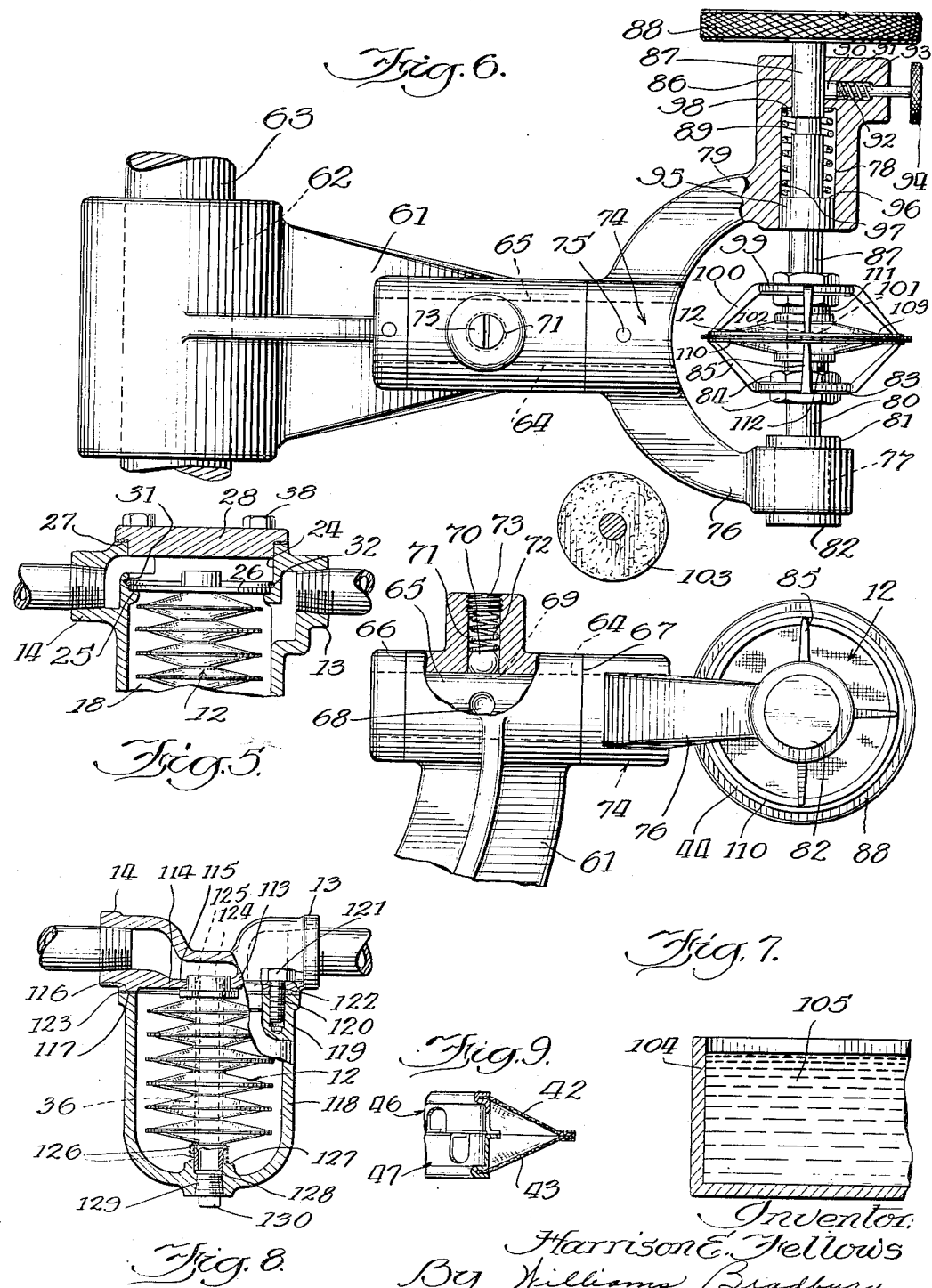

Patented Feb. 5, 1935

1,989,795

UNITED STATES PATENT OFFICE 1,989,795

STRAINER AND METHOD OF MAKING STRAINER UNITS

Harrison E. Fellows, Racine, Wis., assignor to Webster Electric Company, Racine, Wis., a corporation of Wisconsin Application April 7, 1932, Serial No. 603,734

22 Claims. (Cl. 210—165)

The present invention relates to strainers, and is particularly concerned with the provision of improved strainers for use in the supply lines of oil burners. The strainers constructed according to the invention are, however, capable of many different uses, and I do not wish to limit myself to any particular use of the invention.

One of the objects of the invention is the provision of an improved strainer assembly, the capacity of which may be readily adjusted for various installations by merely adding or removing strainer units.

Another object of the invention is the provision of an improved strainer of the class described, which has a great increase in the effective strainer area for a given volume or size of the device.

Another object of the invention is the provision of an improved strainer unit which may be very economically manufactured out of stock materials and which is adapted to be utilized in the strainer assembly to increase the effective strainer area greatly over the strainers of the prior art.

Another object of the invention is the provision of an improved strainer unit which is simple, sturdy and easily cleaned and the provision of an improved method of making strainer units of the class described.

Other objects, features and advantages of the invention will be apparent from the following description and from the drawings, in which similar characters of reference indicate similar parts throughout the several views.

Referring to the drawings, of which there are two sheets:

Fig. 1 is a vertical sectional view of the strainer assembly taken on a plane through the axis of the strainer assembly with some of the strainers in section;

Fig. 2 is a side elevational view of the strainer assembly;

Fig. 3 is a horizontal sectional view taken on the plane of the line 3—3 of Fig. 1, looking in the direction of the arrows;

Fig. 4 is an enlarged sectional view of one of the strainer units, taken on a transverse plane located in the axis of the unit;

Fig. 5 is a fragmentary sectional view of a modified form of strainer casing;

Fig. 6 is a diagrammatic view of one form of apparatus which may be used for making strainer units;

Fig. 7 is a side elevational view of the same apparatus, with the strainer unit in a different position;

Fig. 8 is a view similar to Fig. 5 of another modification;

Fig. 9 is a fragmentary sectional view of a relatively small strainer unit which does not include a spacing ring; and Fig. 10 is a fragmentary sectional view of another form of cap and mounting for the strainer units.

The strainer, which is indicated in its entirety by the numeral 10, preferably consists of a casing 11 of substantially cup shape and preferably formed of cast metal. The casing 11 may, however, take any shape which is necessary for the enclosure of a suitable number of the strainer units 12.

In the preferred embodiment of the invention, the casing 11 at its upper end is formed with an integral inlet fitting 13 and an integral outlet fitting 14 provided with threads for an engagement with appropriate pipes. To facilitate the drainage and cleaning of the strainer assembly, the pipes may be provided with valves 15, 16 on both sides of the strainer assembly. The inlet fitting 13 is provided with a port 17 which communicates with the lower part 18 of the casing 11. The casing 11 is preferably of substantially cylindrical form with the inlet and outlet fittings extending in different directions and with a rounded bottom 19 provided with a cleaning aperture 20. The cleaning aperture 20 is threaded to receive a clean-out plug 21, which may be removed by a wrench or other tool whenever it is desirable to remove the sediment from the chamber 18.

The outlet fitting 14 is provided with an outlet port 22 which communicates with the upper end of the casing 12 through a curved conduit 23 formed in the casting. The interior of the casing 11 may be provided with an enlargement 24 at the upper end and an annular shoulder 25 adapted to provide a seat for a partition plate 26.

The upper end of casing 11 is formed with a flat surface 27 which provides a seat for the cover 28 which has a complementary flat surface 29. The cover is preferably provided with an inwardly extending portion 30 adapted to fit the inside of the casing to secure the cover in predetermined position with respect to the casing, and for the purpose of eliminating air traps underneath the cover.

In some embodiments of the invention, such as Fig. 5, the cover 28 and partition plate 26 may consist of separate metal members. For example, in Fig. 5, the partition plate 26 may be secured in place against the shoulder 25 by the close frictional engagement of the edges of the plate 26 with the interior walls of the enlarged chamber 24. The partition plate may also be secured in place by providing the wall above the plate with an annular semi-circular groove 31 which is adapted to receive a resilient wire 32 of brass, bronze, steel, or the like, which is bent to form a circle and sprung into the groove 31 above the partition 26.

In the embodiment of Fig. 1, the partition plate 26 is provided with a centrally located lug or enlargement 31 also and is connected to the cover 28 by a plurality of radially extending webs 33. The lug 31 and plate 26 are formed with a centrally located threaded bore 34 adapted to receive the threaded end 35 of a perforated tubular member 36. The interior of the tube 36 communicates with the outlet 22 through the conduit 23 and the slots or spaces 37 between the webs 33.

The cover 28 may be secured in place by a plurality of screw bolts 38 passing through the cover and threaded into the body of the casing 11. A compressible packing 39 is interposed between the surface 29 on the cover and the surface 27 on the casing to provide a fluid tight joint and to effect a closure at the upper end of the casing and at the partition, between the two chambers 18 and 24 at the same time.

It is a difficult matter to machine the cover and partition plate 26 and the seating surfaces 27 and 35 so that both the cover and partition will seat exactly at the same time, but with the compressible gasket 39 the gasket may be made as thick as desired or necessary to provide a fluid tight joint for the cover 28 when the partition plate 26 is seated on the annular shoulder 25.

I prefer the form of casing shown in Fig. 1, in which the chamber 18 of the strainer casing is located below the inlet and outlet so that the liquid, such as oil, in the strainer casing, will be retained in place when the strainers are removed for cleaning, thereby preventing the tendency toward displacement of the liquid by or during this operation. However, the casing may be formed in one or more different parts with a removable lower chamber 18 so as to facilitate a view of the strainer screens while they are in place, if desired.

The tube 36 is provided with a multiplicity of apertures 40 adapted to communicate with the interior of the strainer units 12 and with the improved strainer unit construction the apertures 40 may be located at random.

Referring to Fig. 4, this is an enlarged vertical sectional view of the strainer units on the scale of twice the ordinary size of the strainer unit. The strainer unit comprises a pair of discs 42, 43 of metallic screen, which are preferably circular in plan and which have their outer edges secured together by solder 44 at the outer edge. While the discs 42, 43 are substantially frusto-conical in form in the finished strainer unit, they are manufactured out of ordinary flat pieces of metal screen, preferably of non-corrodible metal, such as brass, bronze or copper, and they take their frusto-conical form by means of a slight distortion of their usual flat shape during the process of manufacture.

The discs 42, 43 are formed with centrally located circular apertures 44, 45 at the same time the discs are stamped out of the sheet, and each disc is provided with an inwardly extending sheet metal spacing collar 46, 47. The collars or ferrules 46, 47 comprise stamped sheet metal members, the bodies of which comprise substantially cylindrical portions 48. Each collar is preferably formed with an outwardly extending annular flange 49 at its inner end, the flanges 49 of the two collars engaging each other to insure a proper spacing of the screen discs by the collars. The cylindrical bodies 48 and flanges 49 are provided with a plurality of radially extending apertures 50, which may be located at random, and the apertures 50 of one collar may register with the other, if desired, but it is not necessary, since ports are formed in the collar assembly, whether the apertures 50 register or not.

At the outer end of each collar 46, 47, it is formed with an inwardly extending annular flange 51, which is adapted to engage the inner face of the screen adjacent the edge of the aperture 45. The collars are initially formed with an axially extending flange 52 and the outwardly extending flange 53 initially extends also in an axial direction. When the screen disc 42 has been seated upon the inwardly extending annular flange 51 surrounding the cylindrical flange 52, then a subsequent stamping operation forces the flange 53 from a cylindrical shape to the shape shown in Fig. 4 and causes the screen to be clamped between the flanges 51 and 53. The upper surface 54 of the flange 53 forms a flat seating surface for engaging a complementary surface on adjacent screen units to prevent the liquid from flowing in between the screen units so that the liquid must pass through the screen 42, 43. The aperture 55 formed in the outer ends of the collars 46, 47 is of sufficient size to slidably receive the tube 36.

In some modifications of the invention the ferrules 46, 47 may comprise a single tubular member, the outer ends of which are clamped to wire screens, as shown in Fig. 4, the tube being provided with appropriate apertures.

There is a tendency for the screen discs 42, 43 to collapse adjacent their outer edges just inside the solder 44 and thus materially diminish the volume of the chamber 56 inside the screen unit. In order to prevent the discs 42, 43 from tending to collapse toward each other at their outer edges, the unit is preferably provided with a spacer wire 57. The spacer wire 57 comprises a wire bent to circular shape and located adjacent the outer edges of the discs 42, 43 inside the screen unit. It maintains the two screens in spaced relation to each other and greatly increases the efficiency of the strainer unit adjacent its outer edge.

In some embodiments of the invention the wire might be threaded into the strainer unit through the aperture 50 after the unit is complete, and the wire would spread by reason of its resiliency until it reached the position of Figs. 3 or 4, engaging the inner surface of the screens adjacent the outer part of the strainer unit to spread the screens apart. It is preferred, however, to make the wire of predetermined circular shape and lay it on the lower screen in predetermined position during the manufacture of the strainer unit, the other strainer unit being laid on top and the edges of the screens being forced together and held until they are soldered, clamped or otherwise secured together.

In some cases, the strainer units may be made of perforated or foraminated sheet metal or of duck or other filter cloth, the edges of the cloth being clamped together by means of one or more metal rings and having clamping flanges. If desired, suitable gaskets may be inserted between the respective strainer units to prevent leakage past the strainer collars, and the collars may be urged against each other by the use of a compression spring located at either end of the strainer assembly.

The strainer units 12 are assembled upon the tubular member 36 by placing the tubular member in the apertures 55 of the strainer units. Any number of strainer units may be placed upon a tube 36 to adjust the capacity of the strainer, but the tube 36 need not necessarily be completely covered with strainer units, provided the apertures 40 are omitted at that portion of the tube which is not covered by the strainer units. Accordingly, a strainer of less capacity may be readily constructed by utilizing a shorter tube 36 or by utilizing a tube which has apertures 40 located to register with the strainer units that are carried by the tube. The strainer units 12 have their end surfaces 54 of the flanges 53 engaging each other on the tube to effect a substantial closure between the respective strainer units, and the end of the tube may be closed by a sheet metal cap 58, which is secured in place by means of a transverse pin 59 that passes through apertures in the cap 58 and tube 36.

Referring to Fig. 10, this is a fragmentary elevational view, showing a different arrangement for capping the end of the tube 36. The end of the tube 36 may be threaded as at 106 and provided with an inwardly threaded cap 58. The length of the threaded portion of the tube and the depth of the cap may be made such that the cap has its upper edge 107 in clamping engagement with the collars of the strainer unit assembly, thereby forcing all of the collars of the strainer unit into close engagement with each other, as shown in Fig. 1, or a coil spring 108 may be interposed between the cap and the lowermost strainer unit for the purpose of maintaining the strainer units in close engagement with each other.

The operation of the strainer is as follows: The liquid flows in at the inlet 17 and fills chamber 18. It passes through the frusto-conical screens 42, 43 of the respective strainer units and through the apertures 50 in the collars. It will be observed that the collars 46, 47 form an annular space 60 around the tube, and therefore it is unnecessary that the apertures 40 register with the apertures 50, and the strainers may be placed upon the tube in any convenient manner. The liquid flows through apertures 50 from screens 42, 43 into annular space 60 and through apertures 40 into tube 36. It flows upward out of tube 36 through apertures 37, conduit 33 and out of the outlet 22.

The sediment or other foreign matter in the liquid or oil is retained on the outside of the screens 42, 43 of the strainer units, and the screens may be made very fine without substantially diminishing the flow. A far greater filter area may thus be provided with the strainer units of the class described by reason of the use of the multiple discs in frusto-conical form which are carried side by side on the strainer tube.

Referring to Figs. 6 and 7, these are fragmentary illustrations of apparatus which may be utilized for carrying out the method of construction of the present strainer units. The apparatus may comprise an arm 61 which is provided with a transverse bore 62 for receiving the shaft 63. The arm 61 is provided with a bore 64 at right angles to the bore 62 for receiving the stub shaft 61 which is provided with thrust bearings 66, 67. In order to hold the stub shaft 65 in any of the plurality of rotative positions, the shaft is provided with a plurality of depressions 68, 69 spaced an angular distance of ninety degrees from each other, the depressions being spherical in shape for receiving the spring pressed ball 70. The arm 61 is formed with a bore 71 extending transversely to the bore 64 for receiving the ball 70, spring 72 and a threaded plug 73. The ball 70 is urged into one of the recesses 68, 69 by the spring 71 and it tends to hold the shaft 65 in any predetermined rotative position. The shaft may be turned by hand into any other position, however, since the curved surfaces inside the recesses 68, 69 act to cam the ball upward against the tension of the spring 71 out of the recess 68 or 69.

The stub shaft 65 may support a bifurcated metal member 74 which is screw threaded by a transverse pin 75. The lower forked arm 76 in Fig. 6 is provided with a transverse bore 77 which is in substantial alignment with the axis of a bore 78 in the upper arm 79 of the fork. The bore 77 rotatably supports a stub shaft 80 which is provided with thrust bearings 81, 82, and the shaft 80 is provided with a threaded upper portion which supports a spider 83 by means of a pair of nuts 84. The spider 83 may be provided with a circular body having an aperture for receiving the shaft 80 and with a plurality of radially tapered and diagonally upward extending fingers 85 for engaging the screens 42, 43 just inside their outer edges but outside the spacing wire 57.

The bore 78 in the upper arm 79 of the fork communicates with a counterbore 86 for slidably receiving a plunger shaft 87. The plunger shaft 87 is provided with a knob 88 at its upper end and with an annular groove 89 located to be engaged by a transverse plunger 90. The transverse plunger 90 comprises a rod formed with an annular shoulder 91 which is engaged by a compression spring 92, the other end of the spring being in engagement with the end of transverse bore 93. The plunger rod 90 is also provided with a knob or head 94, to be used in pulling the plunger out of the groove 89.

The plunger rod 87 is provided with an enlargement 95 forming a seat 96 for one end of the compression spring 97, the other end of the spring engaging the end 98 of bore 78. The lower end of plunger rod 87 is also provided with a spider 99 having a plurality of outwardly and downwardly extending fingers 100. The fingers 100 are each provided with rings 109, 110 of wire or sheet metal, as the ring is adapted to engage the screen along the line of a continuous circle and to maintain all parts of the edges of the two screens in close engagement with each other. In some embodiments, however, the rings may be eliminated and a multiplicity of fingers employed. Both the fingers and the rings are preferably made of aluminum or other metal or material to which solder does not adhere when the fingers or rings are dipped in the molten solder.

While the spiders 83, 99 are shown with only a few fingers for the purpose of clarity, it should be understood that a multiplicity of fingers may be provided about the periphery of the spider body, the fingers being sufficient in number to hold the edges of the two screen discs in close engagement with each other.

The shafts 80 and 87 extend toward each other beyond the spiders 83, 99 for the purpose of maintaining the discs in alignment with each other. The shafts 80 and 87 may also be provided with annular shoulders 111, 112 adapted to engage the outer surfaces 53 of the strainer collars and hold these collars together. Thus each shaft extends into the aperture 55 in one of the collars. The shafts are also preferably so formed that the rotation of the upper shaft carries with it the lower one, and for this purpose the upper shaft may be provided with a transverse groove 101 and the lower shaft with a complementary longitudinally extending rib 102. The apparatus is shown in elevation in Fig. 6 just after the spacers, screens and collars have been assembled, but before the soldering operation. It is shown in elevation also in Fig. 5, the bifurcated member 74 having been rotated through ninety degrees on the shaft 65 so that the discs extend in a substantially vertical plane. The diagrammatic showing of Fig. 7 includes a pair of soft felt discs 103 suitably supported for moistening the edges of the screen discs with acid. The complete apparatus may include a small tank 104 into which the edges of the screen discs may be dipped by rotating the arm 61 downward in Fig. 5.

The solder 105 is, of course, maintained in a melted condition so that solder may be applied by dipping, or it may also be applied by means of solder rollers which dip in the solder and convey it to the edge of the disc.

The operation of this apparatus may be substantially as follows:

The plunger 87 may be pushed upward by means of the knob 88 until the plunger 90 engages in groove 89 so that the spiders 89, 90 are held in spaced relation to each other. One of the discs 43 having been assembled with its collar 47, as shown in Fig. 4, the collar 47 is placed on the upper end of shaft 80, the fingers 85 engaging and supporting the lower surface of the disc 43 adjacent its outer edge. A spacer wire 57 may then be placed just inside the outer edge of the screen 43 on the upper surface of the screen. The second screen 42 with its collar 46 may be placed on the lower end of the shaft 87 above screen 43 and spacer wire 57. At this point the screens 42, 43 will be spaced from each other adjacent their outer edges by means of the spacer wire 57 so that it would be difficult to solder the screens together at their edges unless these edges can be brought into close engagement with each other. The operator may then pull outward on the head 94 of plunger 90, compressing spring 92 and drawing the plunger 90 out of the latching groove 89. This will release the plunger 87, which will be urged downward by means of spring 97. The strength of spring 97 is such that when the fingers 85 and 100 engage the screens 42, 43 at the point 106, 107 (Fig. 4) the pressure urging the plungers together is sufficient to force the edges of the screens together about the outer edge of the spacing wire 57.

The edges of the screen discs 42, 43 are held in the position of Fig. 4 by the fingers of spiders 83, 99 so that they may be very conveniently soldered. The bifurcated members 74 may then be turned in a clockwise direction in Fig. 6 to the position of Fig. 7 and the arm 61 in Fig. 7 may be rotated upward into engagement with the acid roll 103. When the operator rotates the knob 88, the edge of the sleeve disc 42, 43 will slide between the adjacent felt discs 103 or rotate the felt discs 103 to cause the acid to be distributed over the edge of the wire screens 42, 43. The arm 61 of Fig. 7 may then be rotated downward in Fig. 7 until the edges of the screen discs dip slightly in the solder 105. Appropriate stops are, of course, provided so that the screen is dipped only to a predetermined depth, and only the edges of the screen are soldered together. The solder may come up high enough to engage the rings 109, 110, or, since the solder will not adhere to the aluminum rings, and, as the rings cover a portion of the screen, they also serve to limit the coverage of the screen with solder and provide the edge of the strainer unit with a soldered portion of substantially uniform width. The rotation of the knob 88 in this position will likewise carry with it the lower shaft 80 by virtue of the complementary interlocking formations 101, 102 on the shafts and the wire screens or wire gauze will have their edges pass through the solder 105 so that they may be soldered very quickly.

It is, of course, possible to assemble and solder the present strainer units manually according to the ordinary methods, but it will be evident that the units may be constructed much more expeditiously and economically by the use of the present apparatus.

Referring to Fig. 9, this is a sectional view of a relatively small strainer unit, that is, one having a smaller diameter than that shown in Fig. 4, but utilizing spacer collars of substantially the same size. It is found that when the strainer units are made of the size or proportions of Fig. 9 and the screens are drawn into a frusto-conical form at a greater angle to each other, the strength and stiffness of the strainer units are greatly increased. Due to the frusto-conical shape and the relatively small width of the screen portions, there is no danger of these screen units collapsing at their outer edges, and the spacer wires 57 are preferably not utilized in such small strainer units.

Referring to Fig. 8, this is a modified form of casing and strainer assembly shown in partial section, in which the upper part of the casing comprises a casting formed with the same inlet and outlet 13 and 14. The casting is also formed with a downwardly extending partition 113, which also extends horizontally at 114 to shut off communication between the inlet 13 and outlet 14 except through a centrally located bore 115. The casing is also provided with a lower flat annular surface 116 for engaging a complementary annular surface 117 on the cup shaped member 118.

The cup shaped member 118 forms the casing for the strainer units, and it is provided with radially extending lugs 119, having threaded bores 120 for receiving the screw bolts 121, which extend through the cover 122 into the bores 120. The gasket 123 may be interposed between the surfaces 116, 117.

The bore 115 in the partition 114 may be provided with an annular fitting 124, having a bore 125 for receiving the upper end of tube 36. Fitting 124 may be a pressed fitting or a threaded fitting in bore 115, and the tube 36 may likewise be a pressed fitting or a threaded fitting in the bore 125 of fitting 124. The strainer units 12 in this embodiment are likewise assembled upon the perforated tube 36, and they may be urged into engagement with each other by a helical compression spring 126 compressed between the lowermost unit and the annular seat 127 which is located about the bore 128 in the cup 118. Bore 128 may be of sufficient size to receive the lower end of tube 36, the cup shaped casing 118 thus closing the lower end of the tube, and the threaded portion 129 of bore 128 may be closed by a plug 130. This embodiment of the strainer has the advantage that the cup shaped casing may be removed from about the strainers.

The present method of constructing strainer units comprises the formation of the wire screen into appropriate units or discs with apertures for the collars, the formation of the collars with the drainage apertures, the clamping or securing of each collar on a disc, the assembly of the collars and discs in predetermined position with the spacing wires, the bending of the edges of the wire discs together outside the spacing wires, and the securing together of the edges of the discs by soldering or otherwise.

The present strainer units are very efficient and sturdy. They may be constructed much more economically than the cylindrical strainer units of the prior art, and the soldering is more easily accomplished and effected in a better manner than with the methods or devices of the prior art. The ordinary cylindrical screens are difficult to solder because the screen has to be formed into the shape of a cylinder and given some support on the inside of the cylinder during the soldering operation. Furthermore, the area of the wire strainer units of the prior art was very limited.

The present strainer units are so constructed that they are provided with an outwardly projecting edge which can be engaged by clamping devices on opposite sides, and the soldering operation is effected very easily when solder can be applied to a projecting edge, as in the present construction. The spacer wire is adapted to prevent the adjacent portions of the screen from collapsing at the edge of the unit, and it greatly increases the efficiency and strength of the strainer unit by providing a sufficient volume of space for the flow of liquid at the outer edge of the unit.

While I have illustrated and described a preferred embodiment of my invention, I contemplate that many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. The method of constructing strainer units comprising forming a plurality of foraminated discs provided with registering apertures, securing a spacer in the aperture of each disc, locating the spacers in engagement with each other, and securing the edges of said discs to each other to form a wafer-like filter unit.

2. The method of constructing strainer units comprising forming a plurality of wire screen discs provided with registering apertures, securing a spacer in the aperture of each disc, forcing the edges of said discs together to provide said wire with substantially frusto-conical formations, and securing the edges of the wire discs together.

3. The method of constructing strainer units comprising forming a plurality of wire screen discs provided with registering apertures, securing a spacer in the aperture of each disc, forcing the edges of said discs together to provide said wire with substantially frusto-conical formations, securing the edges of the wire discs together, and spreading said wire discs from each other at a point spaced from the outer edges of said discs.

4. A strainer unit comprising a pair of substantially flat pieces of wire screen formed with registering apertures for egress of filtered material, means for spacing said screens apart adjacent said apertures, solder means carried by the edge of said screens for securing the edges of said screens together to form a strainer unit which tapers in thickness toward its outer edge, said spacing means comprising a collar clamped on each screen, the inner edges of said collar engaging each other, and said collars being formed with apertures communicating with the spaces between said screens.

5. A strainer unit comprising a pair of substantially flat pieces of wire screen formed with registering apertures for egress of filtered material, means for spacing said screen apart adjacent said apertures, solder means carried by the edge of said screens for securing the edges of said screens together to form a strainer unit which tapers in thickness toward its outer edge, said spacing means comprising a collar clamped on each screen, the inner edges of said collar engaging each other, and said collars being formed to provide an annular space between said collar and a member passing through said collars.

6. In a strainer unit, the combination of a tubular body provided with apertures, said body having inwardly extending flanges at each end engaging inside each of a pair of screen discs, outwardly extending flanges carried by said tubular body for clamping said disc against said inwardly extending flange, a pair of screen discs having apertures for receiving said tubular body, the outer edges of said screen discs being forced into engagement with each other, and solder applied on both sides of said outer edges to secure said outer edges together.

7. In a strainer unit, the combination of a tubular body provided with apertures, said body having inwardly extending flanges at each end engaging inside each of a pair of screen discs, outwardly extending flanges carried by said tubular body for clamping said disc against said inwardly extending flange, a pair of screen discs having apertures for receiving said tubular body, the outer edges of said screen discs being forced into engagement with each other, solder applied on both sides of said outer edges to secure said outer edges together, and a spacer wire comprising a circular member located between said wire screens and adapted to spread the screens apart adjacent their outer edges.

8. In a strainer, the combination of a metal body having an inlet and an outlet with a tubular metal member located in said body and communicating with the outlet, said tubular member having a multiplicity of apertures and a plurality of separate screen units, each unit having a supporting body with a bore adapted to receive said tubular member, each unit having a pair of radially extending screens, the edges of which are secured together, said apertures in said tubular member being located at random, and said supporting bodies for said units being provided with annular spaces and apertures communicating with said apertures in said tubular member.

9. In a strainer, the combination of a metal body provided with a strainer chamber and an outlet chamber, an annular shoulder located between said strainer chamber and outlet chamber, a partition frictionally engaging the walls of said outlet chamber and seated against said annular shoulder, a supporting conduit carried by said partition and communicating with said outlet chamber, a plurality of strainer wafers carried by said conduit, said strainer chamber communicating with said conduit only through said strainer wafers, said body including a cover member integrally formed with said partition, a seating surface on said cover member and said body, means for securing said cover in place, and a compressible packing between said cover and body whereby a fluid tight joint is provided between said cover and body when said partition is seated on said annular surface.

10. In a filter unit the combination of a metallic spacing member provided with an aperture passing through it and with laterally extending apertures communicating with the first-mentioned aperture, a pair of wire screen discs secured to the end of said spacing member and having apertures receiving said spacing member, the edges of said discs being forced together and secured to provide a pair of screen surfaces of substantially frusto-conical form solely supported upon said spacing member.

11. In a filter the combination of a casing having an inlet and an outlet and having a filter chamber with a tubular member communicating with the outlet and located in the filter chamber, said tubular member having a multiplicity of laterally extending apertures, a plurality of filter units, each comprising a pair of discs of wire screen, with the edges of the discs soldered together, said wire screens having spacing members for spreading the wire screens of each unit adjacent the middle thereof, and resilient means carried by said tubular member for engaging said filter units and holding said filter units firmly together on said tubular member.

12. A strainer unit comprising a pair of initially flat pieces of wire screen, each of said pieces of wire screen being formed with an aperture for access to the space between said screens, metallic collar means secured to each of said pieces of screen solely at said apertures for spacing said screens apart adjacent said apertures without obstructing the apertures of said screens and for forcing said screens into tapered shape when the edges of said screens are secured together, and means carried by the edges of said screens for securing the edges of said screens together against the tension of said screens to form a strainer unit tapering in thickness toward its outer edge.

13. A strainer unit comprising a pair of initially flat pieces of wire screen, each of said pieces of wire screen being formed with an aperture for access to the space between said screens, metallic means secured to each of said pieces of screen at said apertures for spacing said screens apart adjacent said apertures and forcing said screens into tapered shape when the edges of said screens are secured together, and solder means carried by the edges of said screens for securing the edges of said screens together against the tension of said screens to form a strainer unit tapering in thickness toward its outer edge, said metallic means comprising annular means having flanges clamping inside and outside both of said screens at said apertures.

14. The method of constructing a strainer unit comprising forming a pair of wire screen members of predetermined shape with apertures in said wire screen members, clamping metallic spacing means secured to said wire screen members in said apertures, forcing the peripheries of said wire screen members into engagement with each other while maintaining the portions of said spacing means spaced from each other to tension said screen and to deform the screen into a tapered strainer unit, securing the edges of said wire screen members together at their peripheries.

15. The method of constructing a strainer unit comprising forming a pair of wire screen members of predetermined shape with apertures in said wire screen members, clamping metallic spacing means secured to said wire screen members in said apertures, forcing the peripheries of said wire screen members into engagement with each other while maintaining the central portions of said screen members spaced from each other to tension said screen and deform the screen into a tapered strainer unit, securing the edges of said wire screen members together at their peripheries by applying solder to the edges of said wire screen members while said edges are held in contact with each other.

16. The method of constructing a strainer unit comprising forming a pair of wire screen members of predetermined shape with apertures in said wire screen members, clamping metallic spacing means secured to said wire screen members in said apertures, forcing the peripheries of said wire screen members into engagement with each other while maintaining the central portions of said screen members spaced from each other to tension said screen and deform the screen into a tapered strainer unit, and dipping the edges of said wire screen members in molten solder while maintaining said edges in engagement with each other until the solder hardens.

17. The method of constructing a strainer unit comprising forming a pair of wire screen members of predetermined shape with apertures in said wire screen members, clamping metallic spacing means secured to said wire screen members in said apertures, forcing the peripheries of said wire screen members into engagement with each other while maintaining the central portions of said screen members spaced from each other to tension said screen and deform the screen into a tapered strainer unit, dipping the edges of said wire screen members in molten solder while maintaining said edges in engagement with each other until the solder hardens, applying a cleaning agent to said edges while held in engagement with each other, and applying molten metal to said edges to secure the edges of said wire screen together at their peripheries.

18. In a strainer, the combination of a fixture having a chamber therein and provided with an inlet and an outlet port leading to said chamber for cooperation with said fixture to form a strainer chamber, one of said ports communicating with a port leading to the interior of said chamber at the center thereof, and the other of said ports leading to a port communicating with a chamber at a point spaced from the center thereof, a tubular metal member arranged in said centrally located port in said chamber and having a plurality of apertures, a plurality of wire screened units fitting about said tubular member and engaging each other to prevent access of fluid to said tubular member except through said wire screens, said tubular member having apertures communicating with the interior of said strainer units, and resilient means for holding said strainer units in engagement with each other to prevent leakage between said strainer units.

19. In a strainer, the combination of a fixture provided with a strainer chamber and with an inlet port and an outlet port, said strainer chamber being formed with a shoulder for receiving a partition, a partition in said strainer chamber, a cover plate having lugs for engaging said partition and holding it against said shoulder, one of said ports communicating with the space above said partition, and the other of said ports with the space below said partition, said partition having an aperture, a tubular metal member carried by said partition and having a plurality of apertures, and a plurality of wire screen units fitting on said tubular member and tapering in thickness toward their outer edges, said wire screen members engaging each other and preventing access of fluid to said tubular member except through said wire screen members.

20. In a strainer, the combination of a fixture provided with a strainer chamber and with an inlet port and an outlet port, said strainer chamber being formed with a shoulder for receiving a partition, a partition in said strainer chamber, a cover plate for closing an aperture in said chamber, said chamber having a groove on one side of said partition opposite from said shoulder, and a resilient metal member partially located in said groove and partially engaging said partition to secure said partition in place, one of said ports communicating with the space above said partition, and the other of said ports with the space below said partition, said partition having an aperture, a tubular metal member carried by said partition and having a plurality of apertures and a plurality of wire screen units fitting on said tubular member and tapering in thickness toward their outer edges, said wire screen members engaging each other and preventing access of fluid to said tubular member except through said wire screen members.

21. In a strainer, the combination of a housing provided with a substantially cylindrical chamber, said chamber having a partition flange extending inward from the wall of said chamber, dividing said chamber into an outlet chamber and an inlet chamber, said housing having an inlet port leading to said inlet chamber, and having an outlet port leading from said outlet chamber, with a screen assembly comprising a multiplicity of screen units for filtering liquid passing through said strainer, said screen assembly being removable as a unit and having a radially extending peripheral flange at one end for engagement above said partition flange to locate said screen assembly in said housing.

22. In a strainer, the combination of a housing provided with a substantially cylindrical chamber, said chamber having a partition flange extending inward from the wall of said chamber, dividing said chamber into an outlet chamber and an inlet chamber, said housing having an inlet port leading to said inlet chamber, and having an outlet port leading from said outlet chamber, with a screen assembly comprising a multiplicity of screen units for filtering liquid passing through said strainer, said screen assembly being removable as a unit and having a radially extending peripheral flange at one end for engagement above said partition flange to locate said screen assembly in said housing, said housing having a peripherally extending groove located in its wall on the inside above said partition flange and spaced therefrom, and a resilient metal member sprung outward into said groove and projecting into said chamber to engage above said radially extending flange of said screen assembly to hold the screen assembly in place.

H. E. FELLOWS.